US012030335B2

(12) United States Patent
Callahan et al.

(10) Patent No.: US 12,030,335 B2
(45) Date of Patent: Jul. 9, 2024

(54) MARKER KIT FOR PROVIDING MARKER WITH SELECTABLE PROPERTY

(71) Applicants: IDEO LP, San Francisco, CA (US); Spin Master Ltd., Toronto (CA)

(72) Inventors: Matthew James Callahan, San Francisco, CA (US); Vlasta Anastasia Komorous-King, Berkeley, CA (US); James Adam Skaates, San Francisco, CA (US); Brendan Boyle, Palo Alto, CA (US); Joshua Lee Finkle, Tampa, FL (US); Andrew Richardson Stewart, San Francisco, CA (US); Chenyu Liu, Cary, NC (US); Justin Chyun Chang, Palo Alto, CA (US); Rikki MariaLynn Devlin, Carmichael, CA (US)

(73) Assignees: IDEO LP, San Francisco, CA (US); SPIN MASTER LTD., Toronto (CA)

( * ) Notice: Subject to any disclaimer, the term of this patent is extended or adjusted under 35 U.S.C. 154(b) by 69 days.

(21) Appl. No.: 17/543,983

(22) Filed: Dec. 7, 2021

(65) Prior Publication Data

US 2022/0258525 A1 Aug. 18, 2022

Related U.S. Application Data

(60) Provisional application No. 63/149,619, filed on Feb. 15, 2021.

(51) Int. Cl.

| | |
|---|---|
| ***B43K 17/01*** | (2006.01) |
| ***A45C 11/34*** | (2006.01) |

(Continued)

(52) U.S. Cl.

CPC .............. *B43K 17/01* (2013.01); *A45C 11/34* (2013.01); *A45C 13/02* (2013.01); *B43M 99/008* (2013.01)

(58) Field of Classification Search

CPC .......... B43K 17/01; A45C 11/34; A45C 13/02

(Continued)

(56) References Cited

U.S. PATENT DOCUMENTS

| | | | | |
|---|---|---|---|---|
| 4,155,446 A * | 5/1979 | Aronson | A45C 11/34 206/214 |
| 6,921,223 B2 * | 7/2005 | Marschand | B43K 27/08 401/17 |

(Continued)

FOREIGN PATENT DOCUMENTS

| | | |
|---|---|---|
| CN | 110944848 A | 3/2020 |
| FR | 3012632 A1 | 5/2015 |

(Continued)

OTHER PUBLICATIONS

Tri-color pen and Highlighter Set. www.qualitylogoproducts.com. (n.d.). https://www.qualitylogoproducts.com/custom-pens/tri-color-pen-and-highlighterset.htm (Year: 2020).*

(Continued)

*Primary Examiner* — Robert J Hicks
*Assistant Examiner* — Sanjidul Islam
(74) *Attorney, Agent, or Firm* — Aird & McBurney LP

(57) ABSTRACT

In an aspect, a marker kit is provided, and includes a plurality of tip holders, a storage member, and an extension member. The tip holders each includes a tip holder body having a connecting portion, and a marker tip extending from the body. The storage member includes a base with a (Continued)

plurality of receptacles, each shaped to removably hold one of the tip holders with the connecting portion exposed. The extension member includes an extension member body for grasping. The extension member body has a securing portion and an actuatable member. The securing portion is releasably connectable to the connecting portion of each tip holder for removal from one of the plurality of receptacles. The actuatable member is for disconnecting the securing portion from the connecting portion of the tip holder that is secured to the extension member so as to release the tip holder back into a receptacle.

4 Claims, 9 Drawing Sheets

(51) Int. Cl.
*A45C 13/02* (2006.01)
*B43M 99/00* (2010.01)

(58) Field of Classification Search
USPC .......................... 206/214, 371; 401/198, 199
See application file for complete search history.

(56) References Cited

U.S. PATENT DOCUMENTS

| | | | |
|---|---|---|---|
| 7,168,876 | B2 | 1/2007 | Nakashima et al. |
| 9,387,412 | B2 | 7/2016 | Truckai |
| 9,561,683 | B2 | 2/2017 | O'Connor |
| 10,189,296 | B2 | 1/2019 | Dorpmund et al. |

FOREIGN PATENT DOCUMENTS

| | | | |
|---|---|---|---|
| NL | 8102409 | A | 12/1982 |
| RU | 2273564 | C2 | 7/2005 |
| WO | WO1995029819 | A1 | 11/1995 |
| WO | 2003008203 | A1 | 1/2003 |
| WO | 2008069776 | A1 | 6/2008 |

OTHER PUBLICATIONS

English translation of FR3012632A1.
English translation of CN110944848A.
English translation of NL8102409A.
English translation of WO1995029819A1.
English translation of RU2273564C2.

* cited by examiner

MARKER KIT FOR PROVIDING MARKER WITH SELECTABLE PROPERTY

CROSS-REFERENCE TO RELATED APPLICATIONS

This application claims the benefit of U.S. Provisional Application No. 63/149,619, filed Feb. 15, 2021, the contents of which are incorporated herein by reference in their entirety.

FIELD OF THE DISCLOSURE

The present invention relates generally to writing implements for drawing on a drawing surface. In particular, the invention relates to writing implements that provide a user with a selectable property for the writing implement.

BACKGROUND OF THE DISCLOSURE

Markers and other writing implements have been known for many years. However, in order to provide a user with a choice of color, a manufacturer typically has provided a set of markers, each having a unique color. This practice, however, can consume an excess amount of plastic.

Some writing implements such as pens, employ several different cartridges of ink in a single pen body, with a mechanism to permit the user to extend whichever cartridge he/she wants to draw with. Such writing implements are beneficial but can have relatively complex mechanisms inside, in order to permit the retraction and extension of the ink cartridges.

It would be beneficial to provide a user with a choice of color (or some other marker property) while at least potentially consuming less plastic than is consumed in the manufacture of some prior art sets of markers.

SUMMARY OF THE DISCLOSURE

In an aspect, a marker kit for providing a marker with a selectable marker property, is provided, and includes a plurality of marker tip holders, a marker tip holder storage member, and an extension member. The plurality of marker tip holders each includes a marker tip holder body having a marker tip holder connecting portion, and a marker tip extending from the marker tip holder body and being shaped to dispense ink. The marker tip holder storage member includes a base having a surface with a plurality of receptacles thereon. Each of the plurality of receptacles is shaped to removably hold one of the plurality of marker tip holders such that the marker tip holder connecting portion of each of the plurality of marker tip holders is exposed. The extension member includes an elongated extension member body for grasping by a user. The elongated extension member body has an extension member securing portion and an actuatable member. The extension member securing portion of the extension member is releasably connectable to the marker tip holder connecting portion of each of the plurality of marker tip holders so as to enable sufficiently strong securing of one of the plurality of marker tip holders to the extension member, for removal from one of the plurality of receptacles. The actuatable member is actuatable for disconnecting the releasably connectable extension member securing portion of the extension member from the marker tip holder connecting portion of the one of the plurality of marker tip holders secured to the extension member so as to release the one of the plurality of marker tip holders back into one of the plurality of receptacles of the marker tip holder storage member.

In another aspect, a marker kit for providing a marker with a selectable marker property is provided and includes a plurality of marker tip holders, a marker tip holder storage member, and an extension member. The plurality of marker tip holders each includes a marker tip holder body having a marker tip holder connecting portion and a marker tip extending from the marker tip holder body and being shaped to dispense ink. The marker tip holder storage member includes a surface with a plurality of receptacles thereon, each of the plurality of receptacles being shaped to apply a first retaining force to removably hold one of the plurality of marker tip holders therein. The extension member includes an elongated extension member body for grasping by a user having an extension member securing portion shaped to mate with and apply a force to the marker tip holder connecting portion of the one of the plurality of marker tip holders, and an actuatable member movable between a locking position and an unlocking position. In the locking position the actuatable member connects the extension member securing portion to the marker tip holder to apply a second retaining force that is greater than the first retaining force, such that when the extension member securing portion of the extension member is mated with the marker tip holder connecting portion of the one of the plurality of marker tip holders held in one of the plurality of receptacles and the actuatable member is in the locking position, the one of the plurality of marker tip holders is withdrawable from the associated one of the receptacles by virtue of the mating of the extension member securing portion and the marker tip holder connecting portion. In the unlocking position, the actuatable member connects the extension member securing portion to the marker tip holder to apply a third retaining force that is less than the first retaining force such that when the one of the plurality of marker tip holders attached to the extension member is inserted into one of the plurality of receptacles, and the actuatable member is in the unlocking position, the one of the plurality of marker tip holders is releasable from the extension member to be removably held in the one of the plurality of receptacles.

BRIEF DESCRIPTION OF THE DRAWINGS

Embodiments will now be described, by way of example only, with reference to the attached figures, wherein.

DETAILED DESCRIPTION OF EMBODIMENTS

Throughout the present disclosure, it will be understood that the term "an" to introduce an element is not intended to mean "one and only one" of that element. It is intended to mean "one or more" of that element, unless it would be obvious to one skilled in the art that more than one of the element would be unusable.

Figure 1A:
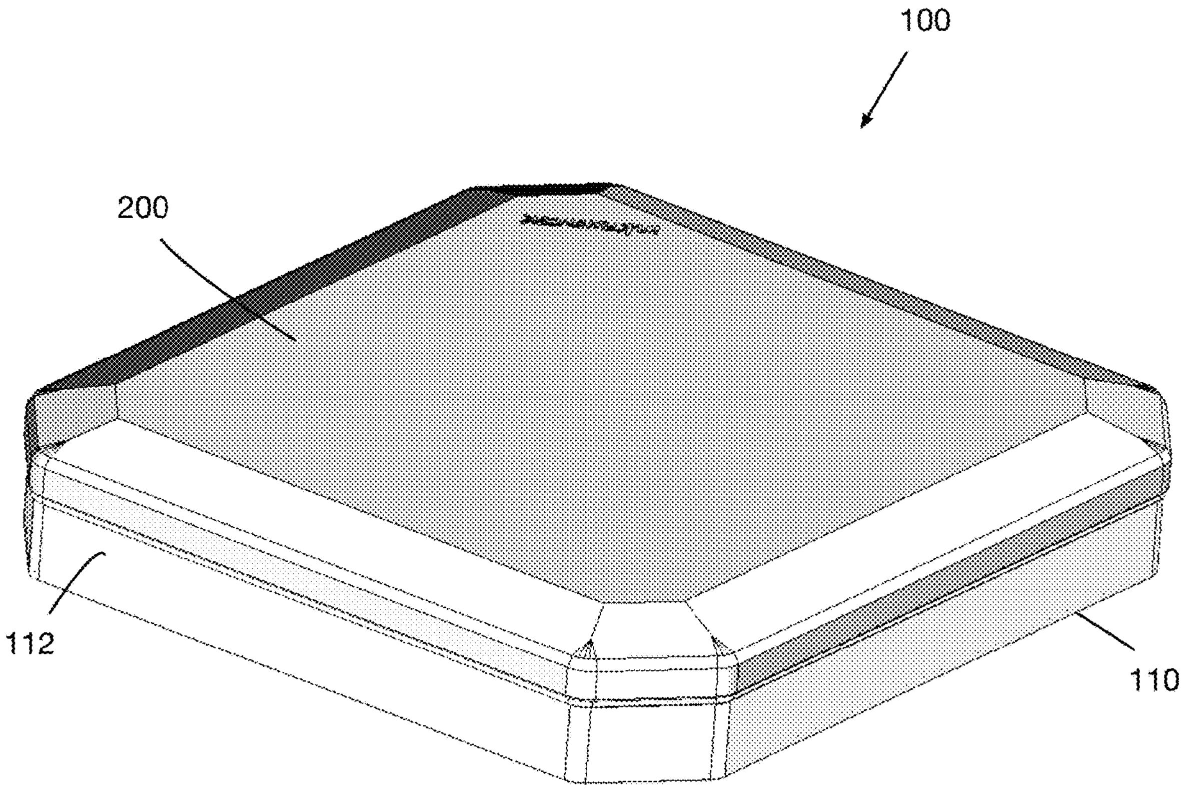
FIG. 1A is a perspective view of an embodiment of the marker kit in accordance with the present invention.
Figure 1B:
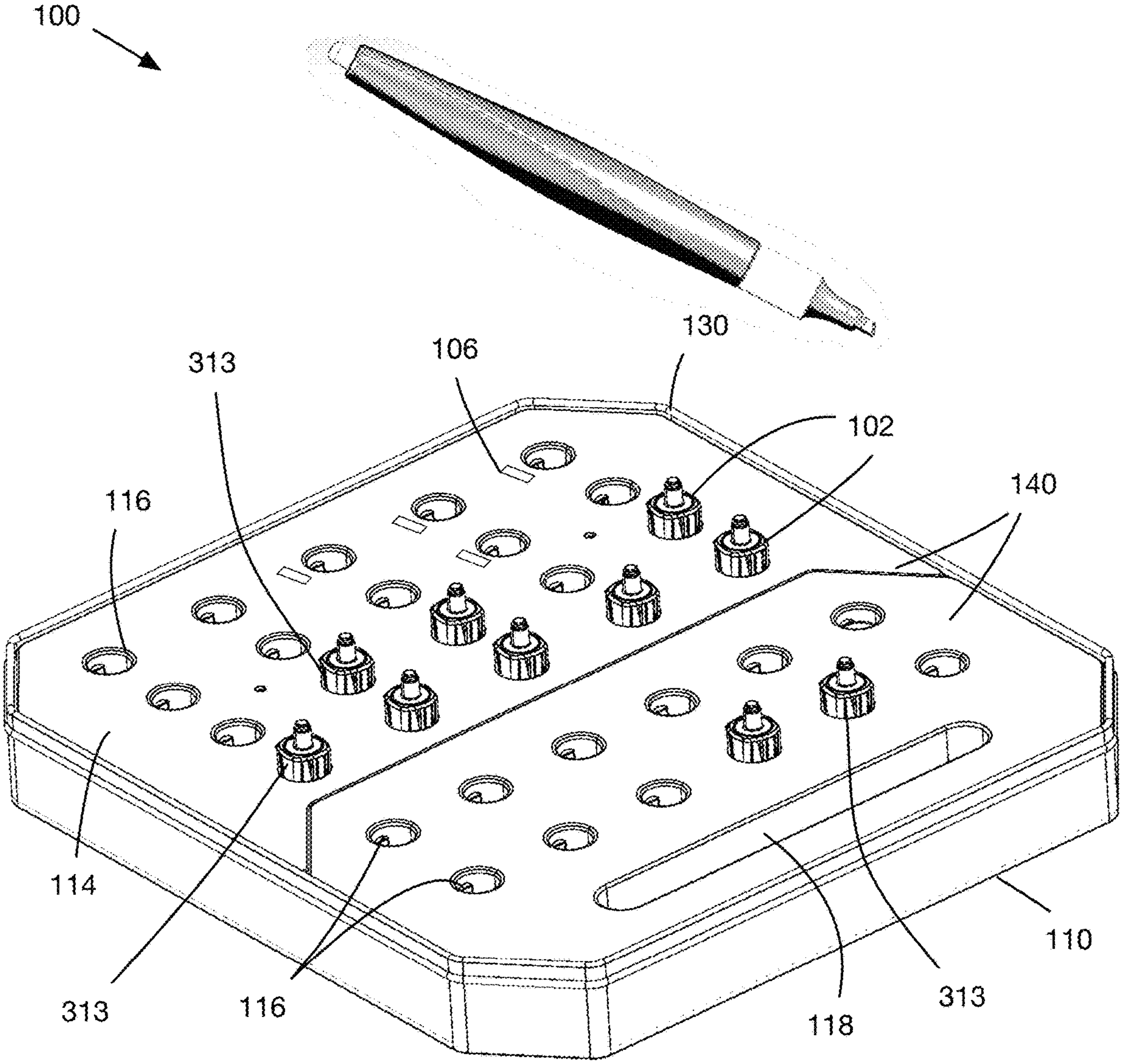
FIG. 1B is a perspective view of the marker kit shown in FIG. 1A, opened.

Referring to FIGS. 1A and 1B, a marker kit 100 is shown, which is used to provide a marker with a selectable marker property. The marker kit 100 comprises a marker tip holder storage member 110, an extension member 120 and a plurality of marker tip holders 102, each having a marker tip 108. The marker tip holders 102 are held by the marker tip holder storage member 110 and are each removably matable to the extension member 120, so as to provide a marker 111 that has a marker property that can be selected. The marker property that may be selected may be, for example, drawing color, or line weight.

Figure 3:
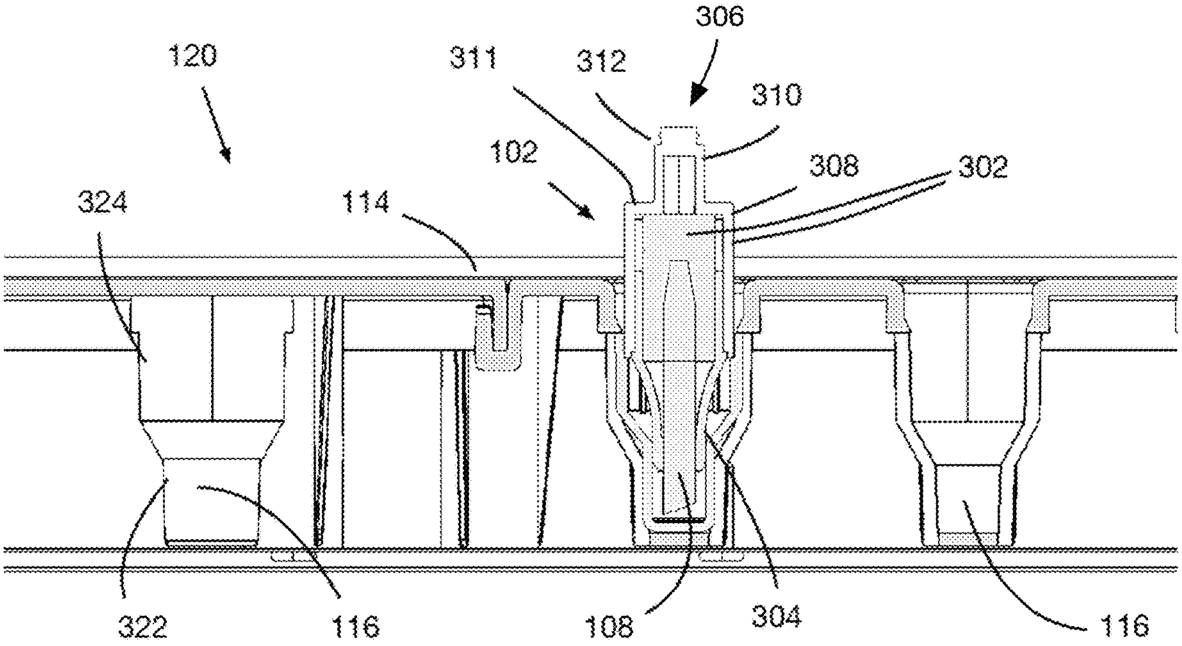
FIG. 3 is a cross-sectional view of one of the plurality of marker tip holders held in the marker tip holder storage member.

Referring to FIG. 3, a cross-sectional view of an embodiment of one of the plurality of marker tip holders 102 is provided.

In the present embodiment, each one of the plurality of marker tip holders 102 has a marker tip holder body 302 and a marker tip 108 that extends from a first end of the marker tip holder body 302. A marker tip holder connecting portion 306 of the marker tip holder body 302 is positioned at a second end of the marker tip holder body 302, that is opposite to the first end of the marker tip holder body 302 is positioned for releasable connection to the extension member 120. The marker tip holder connecting portion 306 may include an axially protruding member 310 that projects axially relative to a surrounding tip holder shoulder 311. The protruding member 310 includes an annular groove 312 positioned near a distal end thereof. The marker tip holder connecting portion 306 is shaped to be received by the extension member 120, as describe further below.

Each of the plurality of marker tips 108 may be a fibrous (e.g. felt) marker tip for dispensing ink that is stored in the associated marker tip holder 102, onto a drawing surface (not shown). It will be noted that a fibrous marker tip 108 is but an example of a suitable type of drawing member for drawing on a drawing surface. Any other suitable type of drawing members could alternatively be used instead of fibrous marker tips 108. For example, the drawing members could instead be ball-point-tipped ink cartridges. In another example, the drawing members could be colored pencil leads.

In an embodiment, at least a portion of the marker tip holder body 302 has an identifier 313 thereon corresponds to the unique color of ink provided by the marker tip 108. The identifier 313 may be in the form of text on the portion of the marker tip holder body 302, or a color of the portion of the marker tip holder body 302. For example, if the marker tip holder 102 holds blue ink, the identifier 313 may be the text 'BLUE' on the portion of the marker tip holder body 302, or may be in the form of blue color on the exterior of the portion of the marker tip holder body 302. As can be seen in FIG. 1B, the identifier 313 is preferably visible even when the marker tip holder 102 is held in the marker tip holder storage member 110.

Referring to FIG. 1A, the marker tip holder storage member 110 includes a base 112, and, optionally, a lid 200. Referring to FIG. 1B, the base 112 has a plurality of receptacles 116. Each of the receptacles 116 is shaped to removably hold one of the plurality of marker tip holders 102. The plurality of receptacles 116 may be provided in a top surface 114 of the base 112, or on any other surface of the base 112.

Optionally, the base 112 also includes an additional extension member receptacle 118 shaped to receive and hold the extension member 120 when the extension member 120 is not in use by a user.

Referring to FIG. 3, an illustrated embodiment of the marker tip holder storage member 110 holding a plurality of marker tip holders 102 therein.

Each of the plurality of receptacles 116 include a plurality of receptacle sections 322 and 324 having varying diameters which correspond to the diameter of a portion of the marker tip holder 102 that will be disposed in the particular section of the receptacle 116. At least one of the receptacle sections 322 and 324 is sized to have an interference fit with the corresponding portion of the marker tip holder body 302. The plurality of sections 322, 324 of each of the plurality of receptacles 116 are specifically sized to apply a first retaining force to hold the marker tip holder 102 therein.

Additionally, each receptacle 116 may be shaped to cooperate with the marker tip holder body 302 so as to form a sealed chamber around the marker tip 108, such that the marker tip 108 is sealed from outside air to as to inhibit drying out of the marker tip 108.

In an embodiment, there is a storage member color indicator 106 positioned on the marker tip holder storage member 110 in association with (e.g. adjacent to) each receptacle 116 so as to identify the color of the one or the plurality of marker tip holders 102 that is to be placed in the receptacle 116. In an alternative embodiment, each of the color indicator 106 is a textual identifier of the color of the one or the plurality of marker tip holders 102 that is to be placed in the receptacle 116 associated with the particular color indicator label 106.

In an embodiment, the top surface 114 of the base 112 of the marker tip holder storage member 110 is separated into one or more separated sections 140. Each of these sections 140 include receptacles 116 for holding a particular subset of the plurality of marker tip holders 102. Each subset may be organised to include the plurality of marker tip holders whose marker tips have a unique color characteristic shared by the other marker tips of that particular subset. For example, all the marker tips in a subset could provide ink of a greyscale color such as black, white and various shades of grey. In another subset, all the of the marker tips could provide various hot colors including shades of red, yellow, orange etc. or cold colours including blues and purples.

The lid 200 is shaped to be removably secured to the base 112 of the marker tip holder storage member 110 so as to enclose the plurality of marker tip holders 102 held within the plurality of receptacles 116. The base 112 of the marker tip holder storage member 110 includes a protrusion 130 extending around a perimeter of the top surface 116 of the base 112 that is shaped to receive an element of the lid for secure attachment thereto.

Figure 2A:
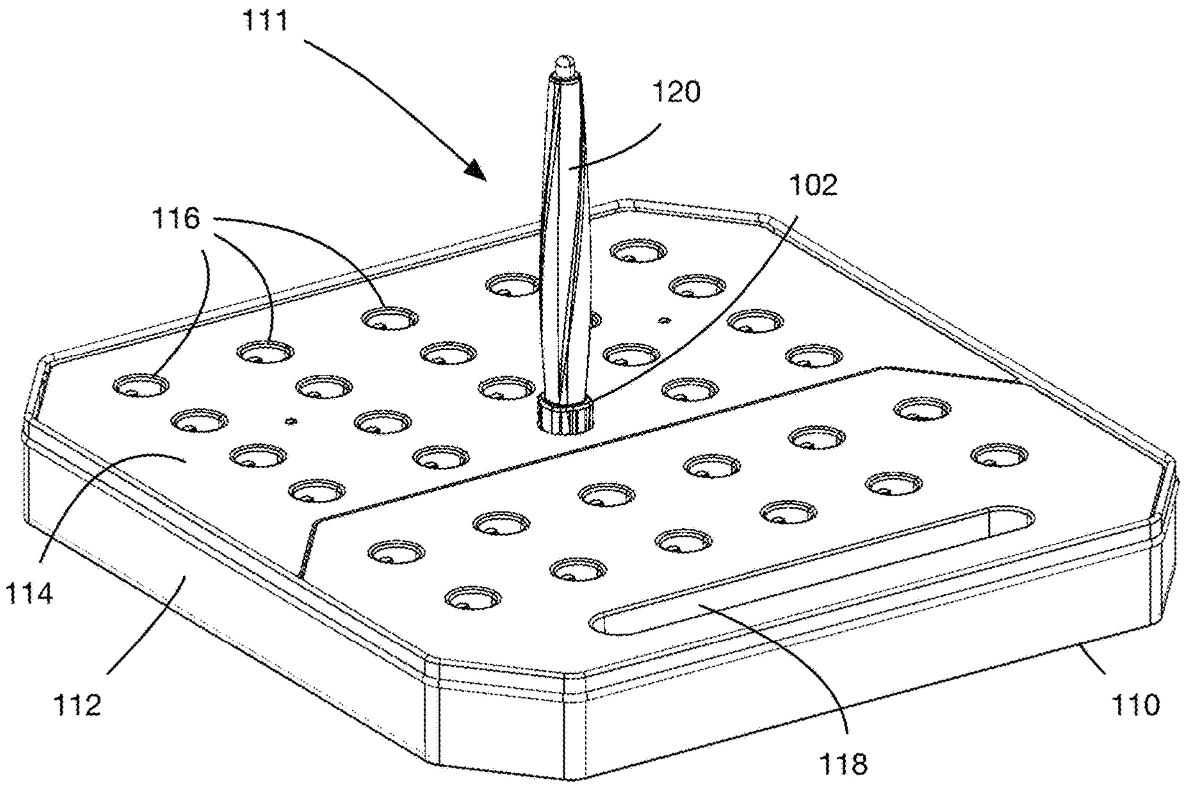
FIG. 2A is a perspective view of a marker tip holder storage member with a marker tip holder of the marker kit, and an extension member connected thereto.
Figure 2B:
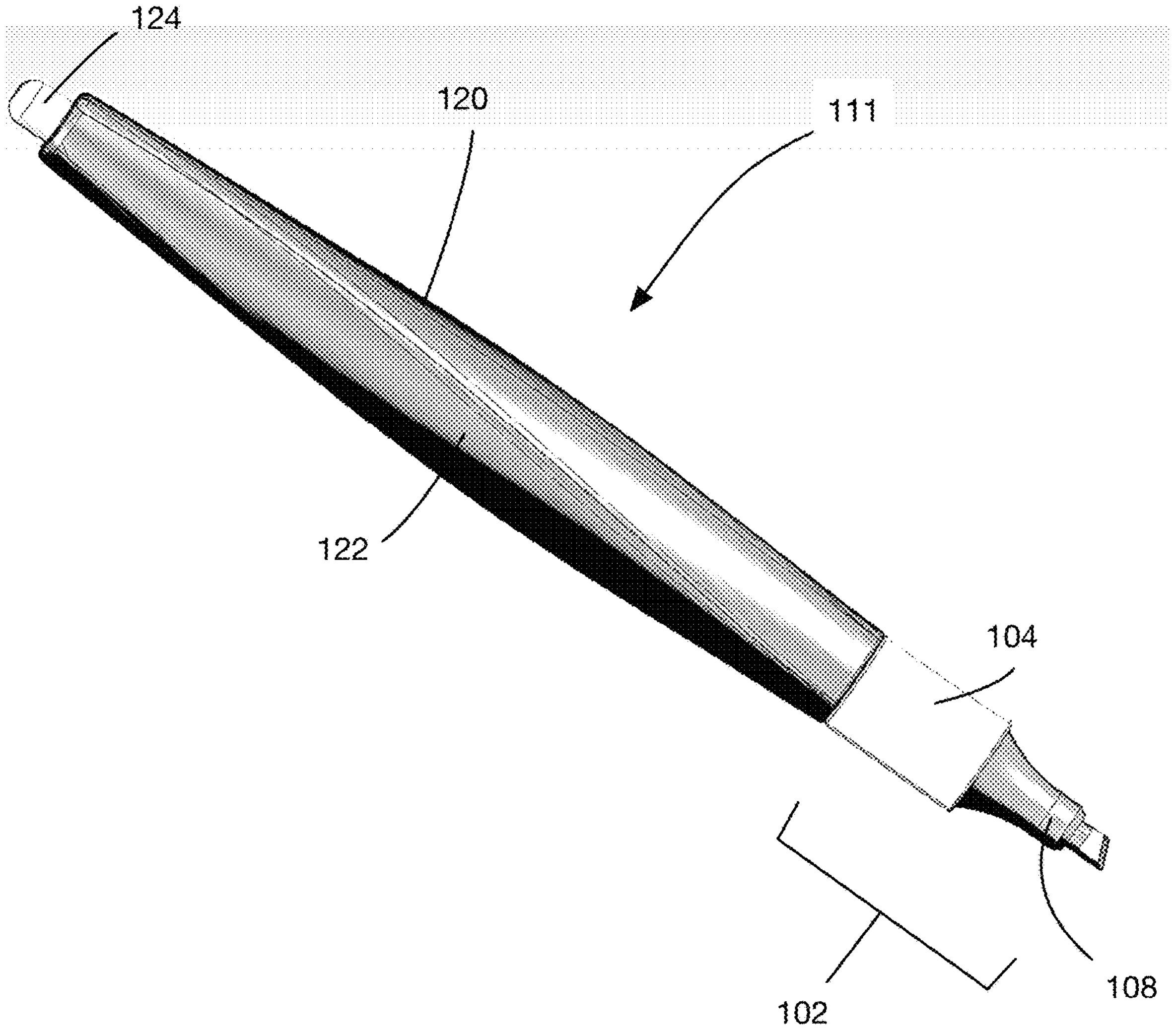
FIG. 2B is a side view of the extension member holding one of the plurality of marker tip holders.
Figure 4:
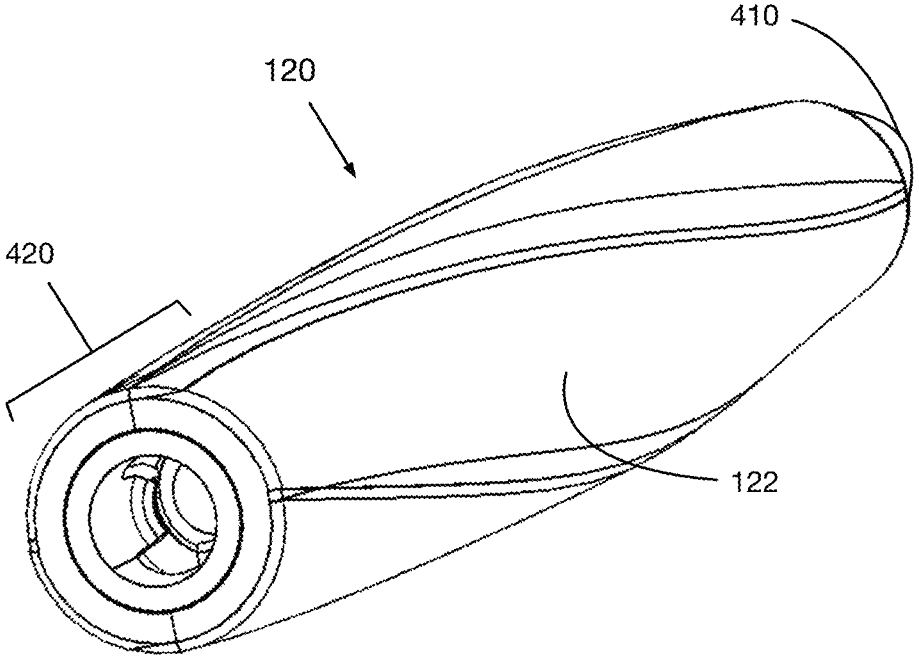
FIG. 4 is an additional perspective view of the extension member of the marker kit.

Referring to FIGS. 1B and 2B, an embodiment of the extension member 120 is shown, holding one of the plurality of marker tip holders 102. The extension member 120 includes an extension member body 122 that is elongated, and which is provided for grasping by a user. With reference to FIG. 4, the extension member 120 includes an extension member securing portion 420 and an actuatable member 410. In the present embodiment, the actuatable member 410 is a pressable element 124 that extends from the extension member body 122 at one end of the extension member 120. The extension member securing portion 420 is positioned to connect to one of the plurality of marker tip holders 102.

The extension member securing portion 420 is releasably connectable to the marker tip holder connecting portion 306 of each of the plurality of marker tip holders 102 so as to enable sufficiently strong securing of one of the plurality of marker tip holders 102 to the extension member 120 to permit removal of one of the marker tip holders 102 from an associated one of the receptacles 116, when the one of the plurality of marker tip holders 102 is held in one of the plurality of receptacles 116.

The actuatable member 410 is actuatable for disconnecting the releasably connectable extension member securing portion 420 from the marker tip holder connecting portion 306 of the one of the plurality of marker tip holders 102 secured to the extension member 102. As shown in FIG. 1B, when a marker 111 is inserted into one of the receptacles 116, actuation of the actuatable member 410 releases the connection between the extension member securing portion 420 and the marker tip holder connecting portion 306 so as to permit the extension member 120 to be lifted away from the associated marker tip holder 102 such that the marker tip holder 102 is retained in the receptacle 116.

Figure 5:
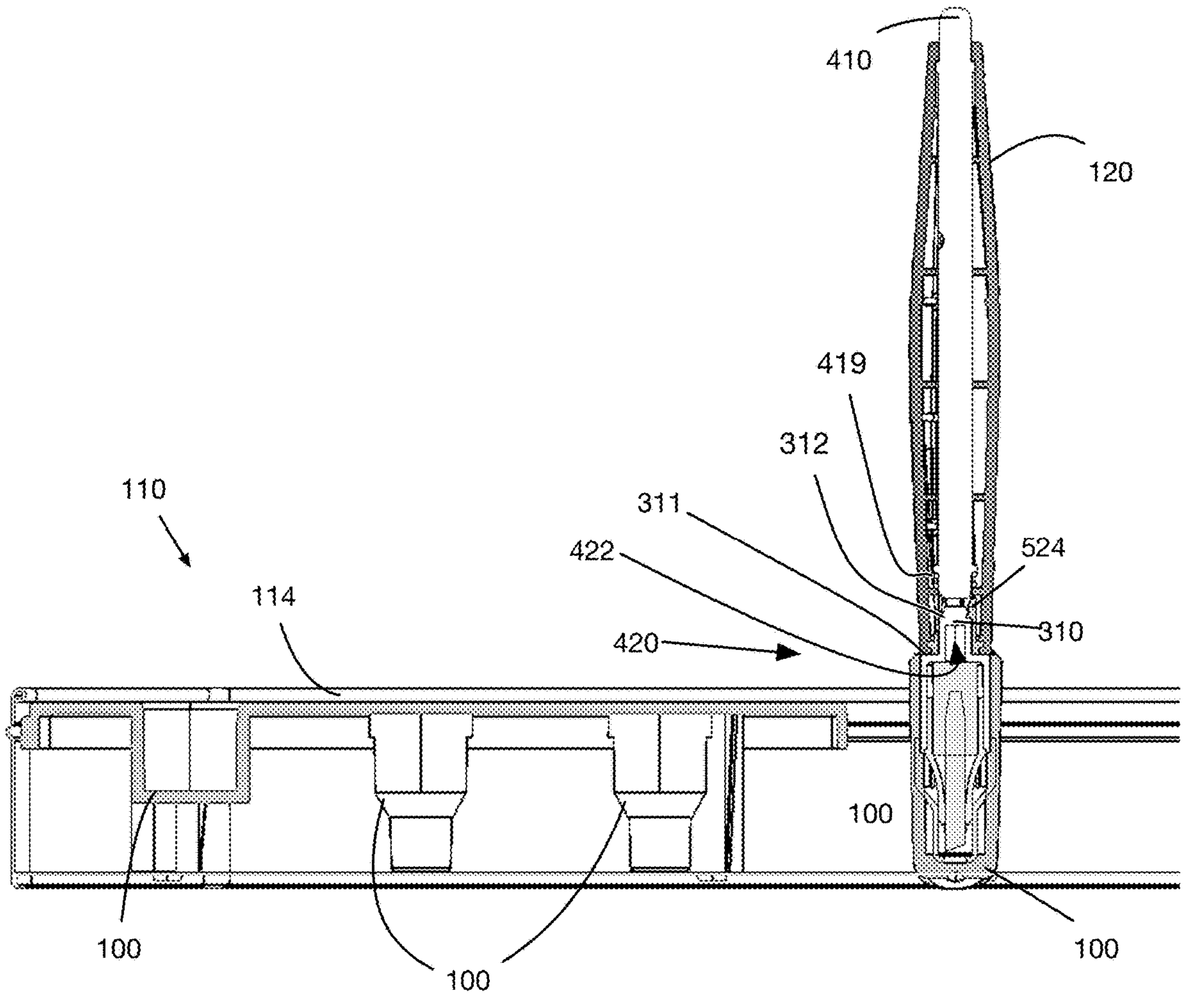
FIG. 5 is a cross-sectional view of an embodiment of one of the plurality of marker tip holders and the extension member connected to the marker tip holder storage member.

Referring to FIG. 5, an illustrated example of the extension member 120 described in FIG. 4 connected to the one of the plurality of marker tip holders 102 held in the marker tip holder storage member 110 described in FIG. 3 is provided.

The extension member securing portion 420 is shaped to mate with and apply a force to the marker tip holder connecting portion of the one of the plurality of marker tip holders 102 when the one of the plurality of marker tip holders 102 is held in one of the plurality of receptacles 116.

In the present embodiment, the extension member securing portion 420 is positioned on a second end of the extension member 120 and is mated with and connected to the one of the plurality of marker tip holders 102. The extension member securing portion 420 includes a recess 422 shaped to receive the protruding member 310 of the marker tip holder connecting portion 306, and a latch member 524 within the recess 422 is engageable with the groove 312 to releasably hold the marker tip holder 102 to the extension member 120.

The actuatable member 410 is movable between a locking position and an unlocking position. In the locking position, the actuatable member 410 permits the extension member securing portion 420 to apply a second retaining force to the marker tip holder 102 that is greater than the first retaining force. When the extension member 120 is held to the marker tip holder connecting portion 306 of one of the plurality of marker tip holders 102 while the one of the plurality of marker tip holders 102 is held in one of the plurality of receptacles 116 while the actuatable member 410 is in the locking position, the second retaining force is sufficiently strong to permit the one of marker tip holders 102 becomes withdrawable from the associated one of the receptacles 116.

When the actuating member 410 is in the unlocking position (FIG. 6A), the actuatable member 410 drives the latch member 524 to a release position, such that the extension member securing portion 420 applies a third retaining force that is less than the first retaining force to the marker tip holder 102. When the one of the plurality of marker tip holders 102 attached to the extension member 102 is inserted into one of the plurality of receptacles 116, and the actuatable member 410 is then moved to the unlocking position, the one of the plurality of marker tip holders 102 becomes releasable from the extension member 120 to be removably held in the one of the plurality of receptacles 116.

The latch member 524 may be biased towards a locking position (FIG. 5). In the embodiment shown, the latch member 524 is biased toward the locking position by a connecting arm 620 (FIG. 6A) that is integral with the latch member 524 that is resiliently movable to bring the latch member 524 away from the locking position to the release position.

Figure 6A:
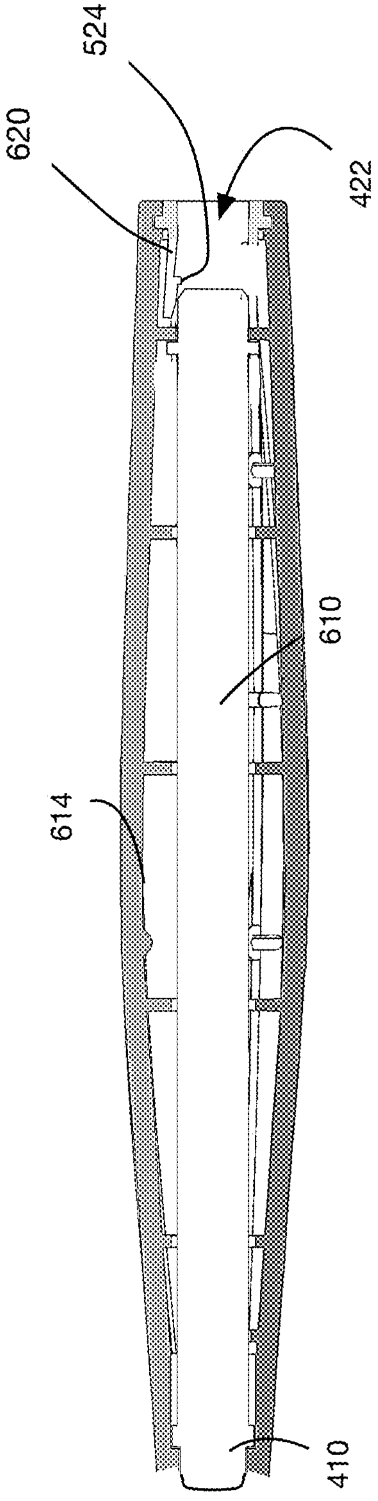
FIG. 6A is a cross-sectional view of an embodiment of the extension member of the marker kit.
Figure 6B:
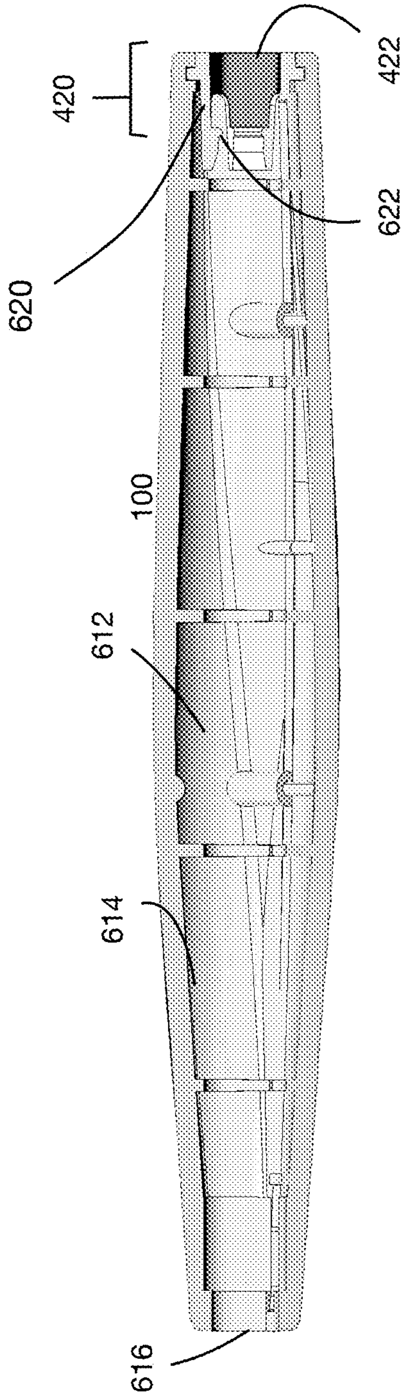
FIG. 6B is a cross-sectional view of an additional embodiment of the extension member.

Referring to FIG. 6A-6B, an embodiment of the extension member including the extension member securing portion 420 on one end thereof and an actuatable member 410 extending through a hollow extension member body of the extension member 120 is provided.

The latch member 524 and is positioned within the recess to apply a force to the protruding member 310 of one of the plurality of marker tip holders 102, thereby securing the marker tip holder connecting portion of the one of the plurality of marker tip holders 102 within the extension member securing portion 420.

The connecting arm 620 can deflect relative to the long axis of the extension member. The connecting arm 620 is positioned within the recess 422 such that when the protruding member 310 of the marker tip holder connecting portion of one of the plurality of marker tip holders 102 is received in the recess 422, the lip 622 of the connecting arm 620 engages the annular groove 312 of the protruding member 310 to apply to the second retaining force that is greater than the first retaining force to the marker tip holder connecting portion.

Referring to FIG. 6B, in the present embodiment, the actuatable member 410 includes an axial rod 610 within a hollow inner portion 612 of the extension member body 122. The axial rod 610 extends along a length of the hollow inner portion 612 and protrudes from an opening 616 in an end of the extension member opposite the end having the extension member securing portion 420, where it is accessible for pressing by a user.

The axial rod 610 of the actuatable member 410 is supported within the hollow inner portion 612 of the extension member 120 so as move between an unactuated position corresponding to the locking position and an actuated position corresponding to the unlocking position, when the portion of the axial rod 610 protruding from the opening 616 is pressed.

In the embodiment shown, a biasing member 419 is engaged with the axial rod 610 and the inner wall 614 of the extension member 120 to bias the axial rod 610 towards the unactuated position. The biasing member 419 may be a compression spring, or any other suitable type of biasing member.

In the present embodiment, when the axial rod 610 is in the unactuated position, the axial rod 610 does not contact the protruding member 310 of the marker tip holder connecting portion of the one of the plurality of marker tip holders 102 held within the extension member 120. The connecting arm 620 of the latch member 524 applies the second retaining force to the marker tip holder connecting portion of the marker tip holder 102.

In moving from the unactuated position to the actuated position, the axial rod 610 slides axially along the hollow inner portion and abuts the protruding member 310 of the marker tip holder connecting portion. In the unlocking position, the abutment of the protruding member 310 by the axial rod 610 disconnects the connecting arm 620 from the annular groove 312 of the protruding member 310.

In the present embodiment, the extension member 120 includes a first end having the extension member securing portion 420 formed thereon and a second end having the actuatable member 410 extending therefrom.

In an embodiment, when the actuatable member is in the actuated position, the connecting arm is disconnected from the annular groove 312 such that it contacts a longitudinal side of the protruding member 310 to apply a third retaining force to the marker tip holder connecting portion.

In an alternative embodiment, when the actuatable member is in the actuated position, the connecting arm is disconnected from the annular groove 312 such that it does not contact the protruding member 310 and the third retaining force applied to the marker tip holder connecting portion has a zero magnitude Although certain writing instruments, marker tip holders and cases have been described herein in accordance with the teachings of the present disclosure, the scope of coverage of this application is not limited thereto.

While an embodiment has been described with specificity to the extension member securing portion including a recess disposed on one end of the extension member and an actuatable member including an axial rod that is pressed to release a marker tip holder from the extension member, other types of implementations can be employed by those of skill in the art.

Figure 2C:
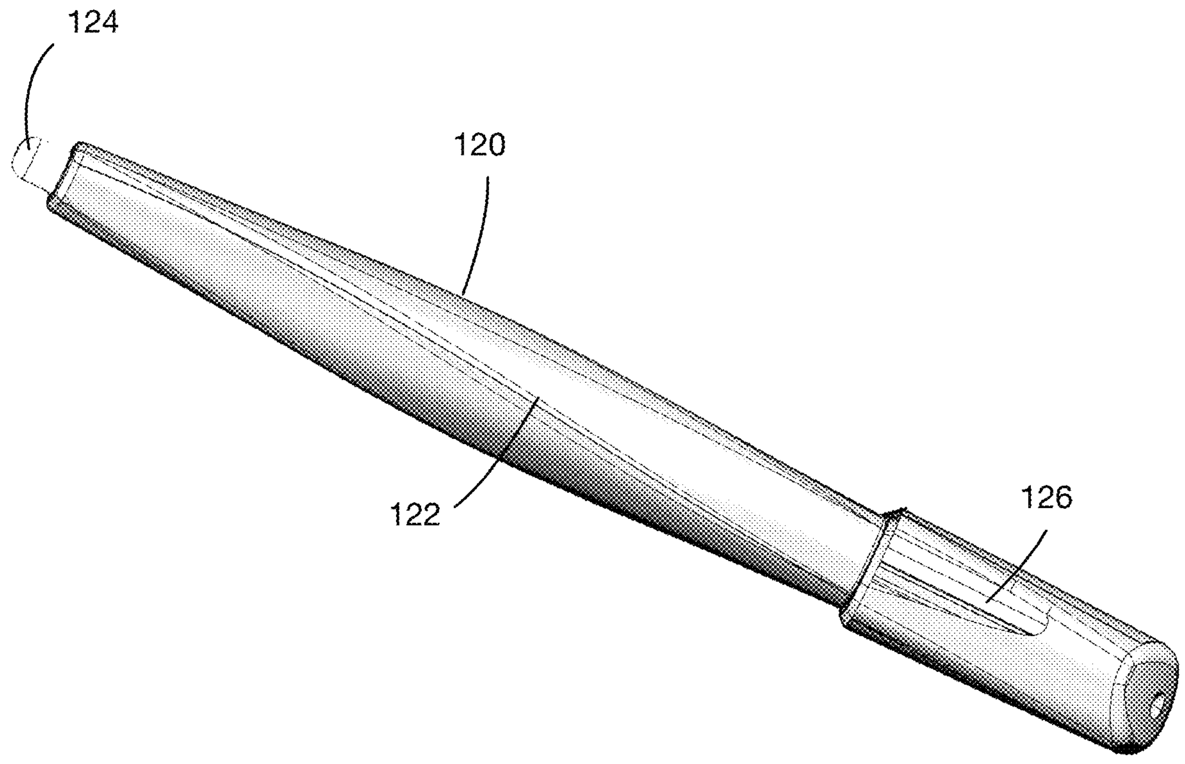
FIG. 2C is a perspective view of a marker from the marker kit, with an optional cap.

In FIG. 2C, an illustrated embodiment of the extension member 120 holding one of the plurality of marker tip holders 102 is provided. In the illustrated embodiment, the extension member holding one of the plurality of marker tip holders also includes a marker tip holder cap 126. The marker tip holder cap 126 is secured over the one of the plurality of marker tip holders 102 that is held in the extension member 120 to inhibit drying of the ink in the marker tip 108.

The marker kit 100 is advantageous for several reasons. On a typical prior art marker, a structure that is most analogous to the extension member is provided for each marker. As a result, a set of prior art markers consumes a significant amount of plastic. By providing an extension member 120 and a plurality of marker tip holders 102, as described herein, less plastic is consumed to provide a user with a wide selection of marker tips.

The above-described embodiments are intended to be examples of the present invention and alterations and modifications may be effected thereto, by those of skill in the art, without departing from the scope of the invention that is defined solely by the claims appended hereto.

What is claimed is:

1. A marker kit for providing a marker with a selectable marker property, comprising:

a plurality of marker tip holders, each including a marker tip holder body having a marker tip holder connecting portion, and a marker tip extending from the marker tip holder body and being shaped to dispense ink;

a marker tip holder storage member including a base having a surface with a plurality of receptacles thereon, each of the plurality of receptacles being shaped to removably hold one of the plurality of marker tip holders such that the marker tip holder connecting portion of each of the plurality of marker tip holders is exposed; and an extension member including an elongated extension member body for grasping by a user, the elongated extension member body having an extension member securing portion and an actuatable member, the extension member securing portion of the extension member being releasably connectable to the marker tip holder connecting portion of each of the plurality of marker tip holders so as to enable sufficiently strong securing of one of the plurality of marker tip holders to the extension member, for removal from one of the plurality of receptacles, and the actuatable member being actuatable for disconnecting the releasably connectable extension member securing portion of the extension member from the marker tip holder connecting portion of the one of the plurality of marker tip holders secured to the extension member so as to release the one of the plurality of marker tip holders back into one of the plurality of receptacles of the marker tip holder storage member, wherein the marker tip holder connecting portion of each of the plurality of marker tip holders includes a protruding member that extends from a surrounding portion of the marker tip holder body, wherein the extension member securing portion of the extension member includes a recess and a latch member, the recess being shaped to receive the protruding member of one of the plurality of marker tip holders, the latch member being positioned within the recess to releasably connect the protruding member of the one of the plurality of marker tip holders to the extension member, wherein the actuatable member of the extension member includes an axial rod positioned within a hollow inner portion of the elongated extension member body of the extension member, the axial rod being supported within the hollow inner portion of the extension member so as move between an unactuated position and an actuated position where the axial rod abuts the protruding member of the one of the plurality of marker tip holders received within the recess of the protruding member such that the latch member is disconnected from the protruding member of the marker tip holder connecting portion of the one of the plurality of marker tip holders.

2. The marker kit of claim 1, wherein the extension member includes a first end having the extension member securing portion of the extension member formed thereon and a second end having the actuatable member extending therefrom.

3. The marker kit of claim 1, wherein the marker tip associated with each of the plurality of marker tip holders dispenses ink having a color, wherein, for each of the plurality of marker tip holders, the color of the ink is different than the color of the ink of each of the other marker tip holders from the plurality of marker tip holders.

4. The marker kit of claim 1, wherein each of the plurality of receptacles has an associated color indicator label located on the surface of the extension member, a color of each associated color indicator label corresponds to the color of the ink dispensed by the marker tips of the plurality of marker tip holders held in the plurality of receptacles.

* * * * *